Feb. 1, 1949.  E. RICHARDSON  2,460,713
GEOMETRICAL MEASURING AND DRAFTING INSTRUMENT
Filed Feb. 10, 1948  2 Sheets-Sheet 1
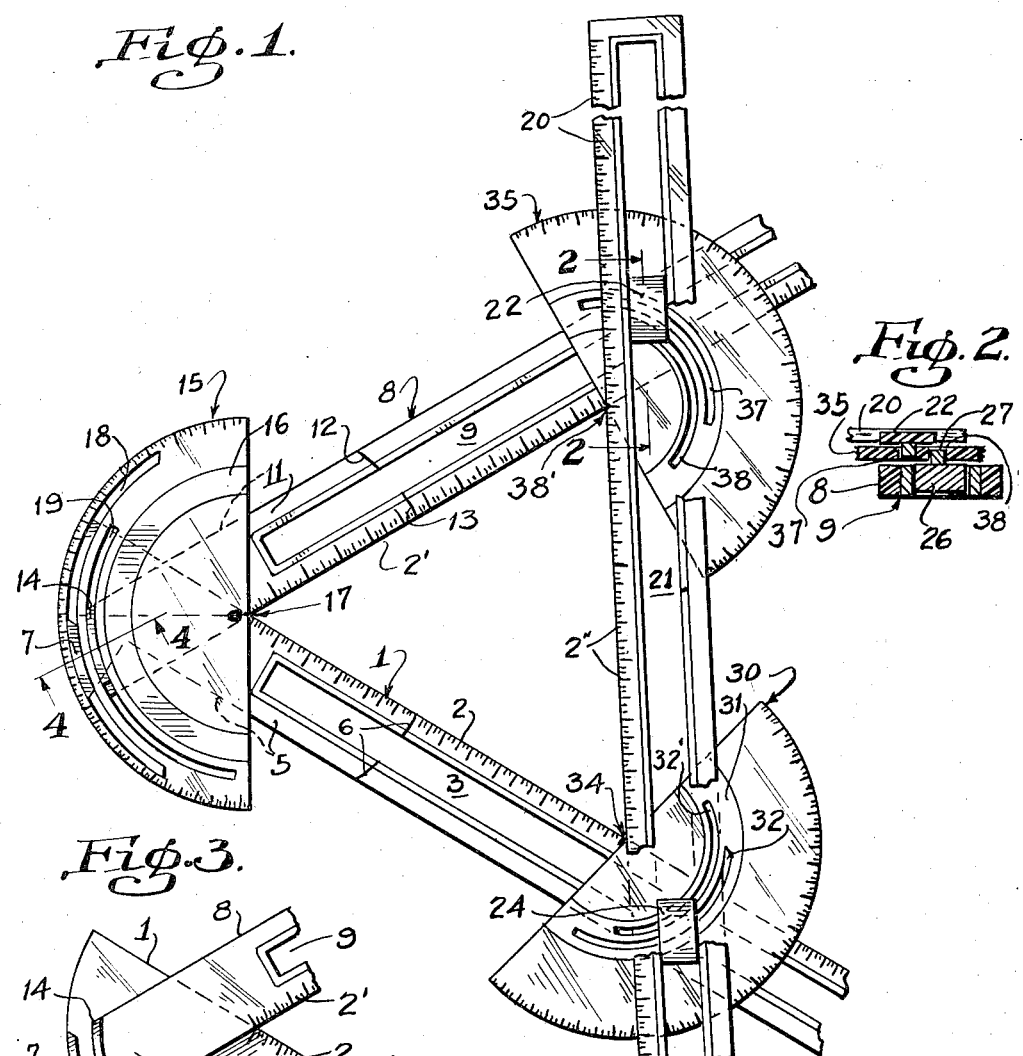
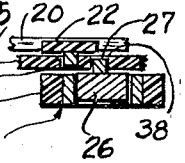
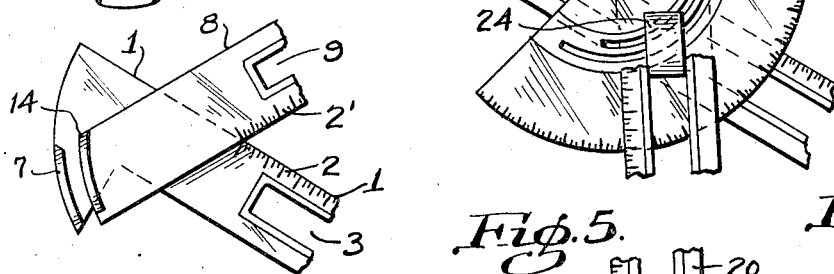
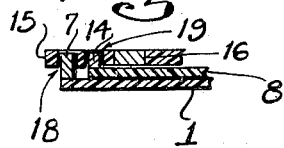
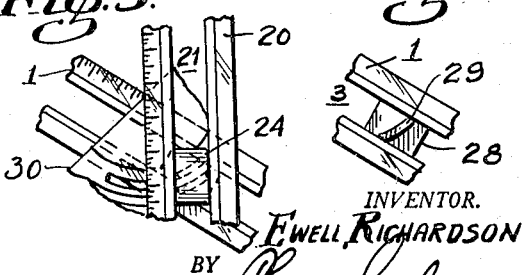
INVENTOR.
EWELL RICHARDSON
BY
ATTORNEY.

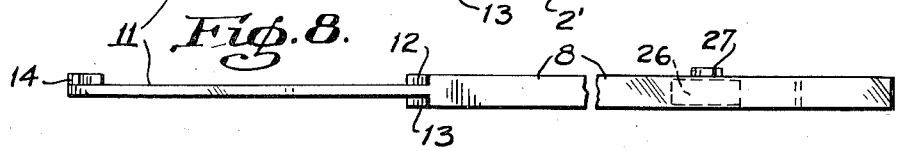
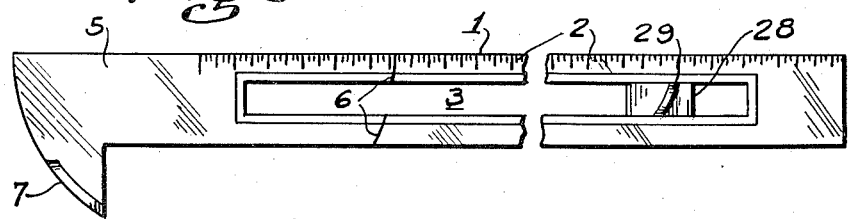
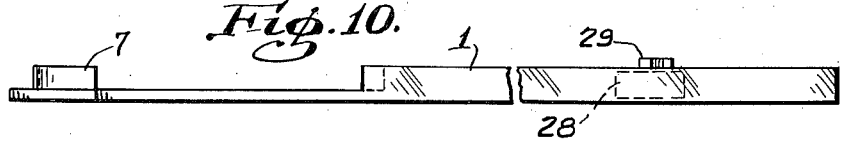
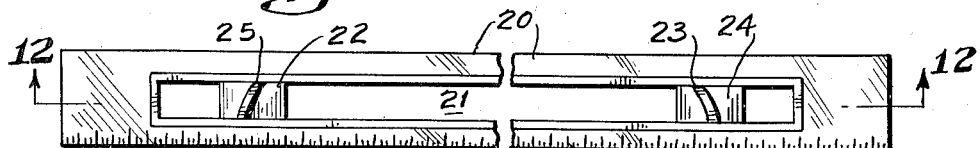
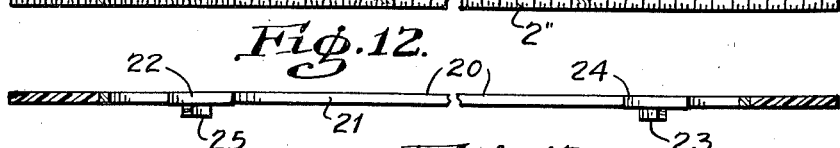
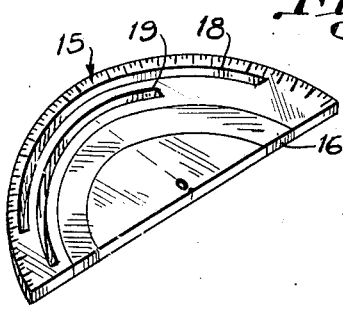

Patented Feb. 1, 1949

2,460,713

UNITED STATES PATENT OFFICE 2,460,713

GEOMETRICAL MEASURING AND DRAFTING INSTRUMENT

Ewell Richardson, Los Angeles, Calif.

Application February 10, 1948, Serial No. 7,398

4 Claims. (Cl. 33—98)

This invention relates to a device for the solution of angles and triangles. It may also be employed for the measuring of angles between intersecting lines and triangles and for the general drafting operations in which angles and triangles are to be constructed or solved.

It is an object of my invention to devise an instrument capable of being employed for drafting involving the construction of angles and triangles and which may be used for the measurement of the same and for the solving of trigonometric problems involving angles and triangles.

Such instruments are of general applicability and find particular utility in the solution of navigation problems.

These and other objects of my invention will be clear from the further description thereof taken together with the drawings, in which Fig. 1 is a plan view of my instrument with parts broken away for clarity;

Fig. 2 is a section taken along line 2—2 of Fig. 1;

Fig. 3 is a fragmentary detail of two arms employed in my structure showing their relation;

Fig. 4 is a section taken along the line 4—4 of Fig. 1;

Fig. 5 is a fragmentary detail showing the relationship of the slide and one of the arms of my device;

Fig. 6 is a similar detail relating to another arm of my device;

Fig. 7 is a plan view of one of the arms of my device showing the slide in position;

Fig. 8 is a side view of Fig. 7;

Fig. 9 is a plan view of another arm employed in my structure showing the slide positioned therein;

Fig. 10 is a side view of Fig. 9;

Fig. 11 is a plan view of the third arm of my device showing two slides in position;

Fig. 12 is a section taken along the line 12—12 of Fig. 11; and

Fig. 13 is a perspective view of one of the semicircular discs employed in my structure.

My device is composed of a plurality of intersecting arms arranged in adjustable angular relationship as illustrated in the drawings.

The arms 1 and 8 are arranged in angularly adjustable relation to each other and held in such relationship by means of a plate 15. Arm 8 is composed of a flat bar having a straight edge 2 suitably engraved with rule markings and carries a slot 9 which may be faced with a hard wear-resistant surface material such as a metal strip. The arm is chamfered at 12 and 13 to give an arcuate shoulder of radius to be further described and an extension 11 which terminates in an upstanding arcuate flange 14 of radius curvature to be further explained. The upstanding flange 14 may be of metal or other wear-resistant material. Arm 1 is formed similarly to that of arm 8 in that it carries a straight edge 2 carrying ruler markings and having a slot 3 similar to the slot 9 and chamfered at 6 to give an arcuate shoulder of radius curvature equal to that of 12 and 13. It carries an extension 5 on which is positioned an upstanding flange 7 of arcuate fashion. The flange 7 may be of wear-resistant material such as metal. The plate 15 which is formed with suitable protractor markings with zero centered at 17 carries two concentric slots 18 and 19 centered at 17 and overlapped as shown in the drawings. The plate 15 may have an insert 16 which is surfaced with a wear-resistant material such as a metallic surface on the underneath side of the plate 15 where the arms rub over the surface, as will be explained hereinafter. The arm 8 is mounted so that the flange 14 enters slot 19. The radius of curvature of the arcuate flange 7 is equal to the radius of curvature of the slot 18 and also centered at point 17. In like manner the arcuate flange 14 enters the arcuate slot 19 being of equal radius of curvature and likewise centered at 17. As shown the arm 8 overlies arm 1 and the plate 15 overlies arm 8.

It will be observed that the radius of curvature of chamfers 12, 13, and 6 is equal to the radius of curvature of the outside edge of the semicircular plate 15. The chamfers thus form the extensions with an upper surface below the top surface of the main portion of the arms. It will also be observed that due to the formation as indicated the underneath surface of arm 1 and the underneath surface of arm 8 to the right of the chamfers 12 and 13, and also 6, as viewed on Fig. 7, are coplanar so that the two arms may be laid upon a surface in such fashion that the inside edges 2 and 2' form ruling surfaces.

It will also be observed, as will be more fully explained below, that the arms 1 and 8 may be angularly adjusted with relation to each other by sliding the flanges 7 and 14 inside the slots 18 and 19 and at all times the edges 2 and 2' will intersect the edge of the plate 15 at point 17, i. e., at 0 of the protractor scale. The action of these two arms may therefore be described as a scissor action pivoted at 17 due to the sliding of the flanges thereof in a circular slot which is centered at 17. The plate 15 may be of transparent material, such as methylmethacrylate plastic, Celluloid, or glass, and carry suitable degree markings as in a protractor, and it is therefore possible to see the underneath edges 2 and 2', particularly if the arms are also made of a transparent material such as methylmethacrylate plastic, Celluloid or glass, and in that way the angle between edges 2 and 2' may be read from the protractor plate 15. The instrument thus in this stage, that is, composed merely of arms 1 and 8 and the plate 15, is useful for construction or measurement of an angle by setting the 0° point 17 over the vertex of the angle.

It will also be observed that because of the presence of the chamfers the arms may be opened 180° from each other, the circular edge of the plate 15 passing over the extensions 5 and 11 and by the chamfers 6 and 12, since the radius of curvature of 12 and 6 is equal to the radius of curvature of the edge of plate 15 and equally centered at 17.

In order to complete the mechanism for the forming of a triangle, I have also provided an additional arm 20 and two additional plates 30 and 35 to be next described.

Slidably positioned within the slot 9 is a block 26 of thickness equal to the maximum thickness of arm 8 and carrying an upstanding arcuate flange 27 directed in the same direction as the flange 14. Slidably positioned in slot 3 of arm 1 is a like slide 28 of thickness equal to the maximum thickness of arm 1 and carrying an upstanding arcuate flange 29 directed in the same direction as flange 7. The arm 20 has a ruled edge 2" and a slot 21 faced with a hard wear-resistant facing such as that shown for arms 1 and 8 and carries slidably mounted therein two slides 22 and 24, respectively of width equal to the thickness of arm 20 and carrying depending arcuate flanges 23 and 25 respectively.

In mounting the arm 20 upon arms 8 and 1 plates 30 and 35 are provided of construction quite similar to that of plate 15. The plate 30 carries a zero mark 34, being the center of the semi-circular disc, and carries a wear resistant plate 31 in which are positioned two arcuate grooves 32 and 32' centered at 34. The radius of curvature of grooves 32 and 32' is the same as the radius of curvature of the flanges 29 and 23 and similarly centered at 34 so that the plate 30 may be placed on top of arm 1, the flange 29 entering the groove 32'. In like manner the plate 35 is constructed like 30 and carries two arcuate slots 37 and 38 centered at 38' which is the center of the semi-circular edge of plate 35. The upstanding flange 27 will enter the slot 38, being of equal and like curvature, and the depending flange 25 of slide 22 will enter the slot 37, being of equal and like curvature. In this fashion the plate 30 may be placed upon arm 1 and the plate 35 may be placed upon arm 8 and the arm 20 may overlie the plates 30 and 35 in such fashion that the depending flanges 25 and 23 enter the corresponding arcs of the respective plates 35 and 30, while the upstanding flanges 27 and 29 of the corresponding arms 1 and 8 enter upwardly into the slots 38 and 32'.

It will thus be seen that the arm 20 can be made to take any angular position with respect to the arms 1 and 8 such that the sum of the angles between the arms 20 and 1 and between 8 and 20 and between 8 and 1 equals 180°.

It will also be seen that at any angular setting between 1 and 8, the arm 20 may be adjusted with respect to either 1 or 8 to any degree trigonometrically permissible by the angle between arms 1 and 8 and once so set the arm 20 may be moved in parallel relationship to its initial setting outwardly upon arms 8 and 1. This is effected by the angular adjustment permitted by the cooperation of the slides and the plates 30 and 35. It will also be observed that for any angular setting of the arm 20 with respect to either arm 1 or 8, the ruled edges will intersect at 38' and 34 respectively and in this fashion the angle between arm 20 and corresponding arms 1 and 8 may be read respectively upon the plates 30 and 35.

While I have described a particular embodiment of my invention for the purpose of illustration, it should be understood that various modifications and adaptations thereof may be made within the spirit of my invention as set forth in the appended claims.

I claim:

1. A geometrical instrument comprising a plate, a pair of concentric arcuate slots in said plate, an arm, an arcuate flange on said arm, of curvature similar to the curvature of one of said slots and slidably positioned in said slot, a second arm, a second arcuate flange on said second arm, of curvature similar to the other of said slots and slidably positioned in said other slot.

2. A geometrical instrument comprising a protractor plate, a protractor scale on said plate, a zero mark on said protractor scale, a pair of concentric arcuate slots in said plate, an arm, an arcuate flange on said arm, of curvature similar to the curvature of one of said slots and slidably positioned in said slot, a second arm, a second arcuate flange on said second arm, of curvature similar to the other of said slots and slidably positioned in said other slot, each of said arms having a ruled straight edge along opposed longitudinal faces of said arms, said edges intersecting at said zero mark.

3. A geometrical instrument comprising a protractor plate, a protractor scale on said plate, a zero mark on said protractor scale, a pair of concentric arcuate slots in said plate, an arm, an arcuate flange on said arm, of curvature similar to the curvature of one of said slots and slidably positioned in said slot, a second arm, a second arcuate flange on said second arm, of curvature similar to the other of said slots and slidably positioned in said other slot, each of said arms having a ruled straight edge along opposed longitudinal faces of said arms, said edges intersecting at said zero mark, said plate also having a circular edge, centered at said zero mark, each of said arms being chamfered to form an arcuate chamfer of radius of curvature substantially equal to the curvature of said circular edge and centered at said zero mark on said plate.

4. A geometrical instrument comprising a protractor plate, a protractor scale on said plate, a zero mark on said protractor scale, a pair of concentric arcuate slots, an arm, an arcuate flange on said arm, of curvature similar to the curvature of one of said slots and slidably positioned in said slot, a second arm, a second arcuate flange on said second arm, of curvature similar to the other of said slots and slidably positioned in said other slot, each of said arms having a ruled straight edge along opposed longitudinal faces of said arms, said edges intersecting at said zero mark, said plate also having a circular edge centered at said zero mark, each of said arms being chamfered to form an arcuate chamfer of radius of curvature substantially equal to the curvature of said circular edge and centered at said zero mark on said plate, each of said arms containing a slot, a slidable block in said slot, an arcuate ridge on each of said blocks, a third arm, a slot in said third arm, a pair of blocks slidably placed in the slot in said third arm, each of said pair of blocks having an arcuate ridge, a pair of plates, each of said plates carrying a pair of concentric slots, said plates each being placed between the third arm and said first mentioned arm, the arcuate flanges of said blocks entering said arcuate slots and being slidably positioned therein.

EWELL RICHARDSON.

No references cited.